United States Patent [19]
Enari

[11] Patent Number: 5,774,624
[45] Date of Patent: Jun. 30, 1998

[54] IMAGE SIGNAL RECORDING APPARATUS HAVING INTRAPICTURE AND INTERPICTURE CODING MODES

[75] Inventor: Masahiko Enari, Kanagawa-ken, Japan

[73] Assignee: Canon Kabushiki Kaisha, Tokyo, Japan

[21] Appl. No.: 453,437

[22] Filed: May 30, 1995

Related U.S. Application Data

[63] Continuation of Ser. No. 992,851, Dec. 16, 1992, abandoned.

[30] Foreign Application Priority Data

Dec. 25, 1991 [JP] Japan .................................. 3-343584
Dec. 25, 1991 [JP] Japan .................................. 3-343585

[51] Int. Cl.⁶ .............................. H04N 5/76; H04N 5/92
[52] U.S. Cl. ............................................ 386/111; 386/112
[58] Field of Search ................................... 358/335, 310, 358/342; 360/8, 9.1, 33.1, 32; 348/411–417; 386/109–112, 68, 33; H04N 5/76, 5/78, 5/781, 5/783, 5/782, 5/92, 9/79, 7/12

[56] References Cited

U.S. PATENT DOCUMENTS

| | | | |
|---|---|---|---|
| 4,931,879 | 6/1990 | Koga et al. | 358/335 |
| 4,942,476 | 7/1990 | Koga et al. | 358/335 |
| 5,140,437 | 8/1992 | Yonemitsu et al. | 358/335 |
| 5,191,436 | 3/1993 | Yonemitsu | 358/335 |
| 5,231,384 | 7/1993 | Kuriacose | 358/141 |
| 5,270,828 | 12/1993 | Mogi | 358/343 |

FOREIGN PATENT DOCUMENTS 366272 3/1991 Japan .

*Primary Examiner*—Thai Tran
*Attorney, Agent, or Firm*—Robin, Blecker & Daley

[57] ABSTRACT

A video signal recording apparatus is capable of compressing the amount of information of a video signal sequentially containing a plurality of pictures correlated to one another. In this compression, the video signal recording apparatus can selectively assume an intrapicture coding mode for executing compression by using only a correlation within each of pictures of the video signal and an interpicture coding mode for executing compression by using a correlation between a plurality of pictures of the video signal. When a video signal the amount of information of which is compressed is to be recorded on a recording medium, the video signal recording apparatus starts recording with a video signal compressed in the intrapicture coding mode. When a video signal compressed by variable-length coding is to be recorded while sequentially forming a multiplicity of tracks on a recording medium, the video signal recording apparatus begins recording a picture to be recorded immediately after the start of recording, at the forefront of the tracks.

19 Claims, 8 Drawing Sheets

FIG. 4

| FRAME ORDER | CONNECTED CONTACT OF EACH OF SWITCHES 82 AND 108 |
|---|---|
| FIRST FRAME | a |
| SECOND FRAME | c |
| THIRD FRAME | d |
| FOURTH FRAME | b |
| FIFTH FRAME | c |
| SIXTH FRAME | d |
| SEVENTH FRAME | b |
| EIGHTH FRAME | c |
| NINTH FRAME | d |
| TENTH FRAME | a |
| FLEVENTH FRAME | c |
| TWELFTH FRAME | d |
| THIRTEENTH FRAME | b |
| FOURTEENTH FRAME | c |
| FIFTEENTH FRAME | d |

START OF RECORDING →

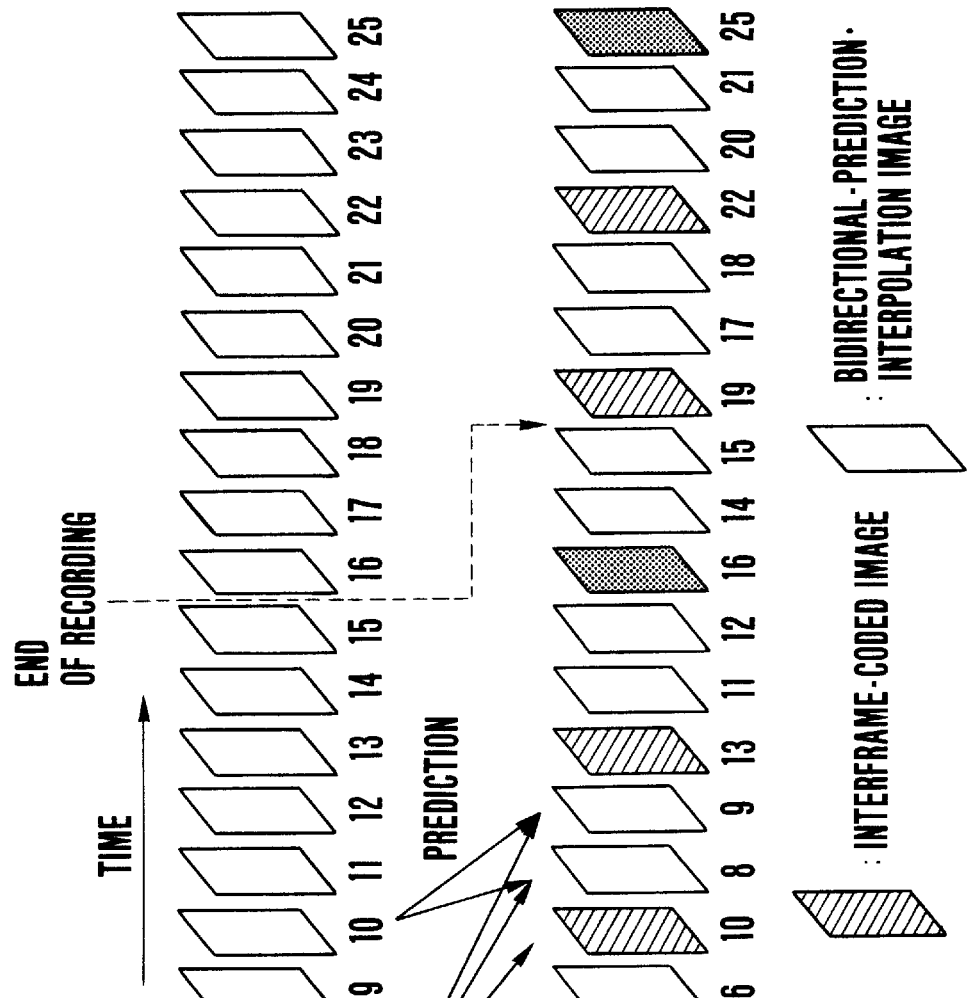
F I G. 5(a)
F I G. 5(b)

FIG.6

| IMAGE AT THE TIME OF STOP OF RECORDING | RECORDED IMAGES |
|---|---|
| 7 | 7 |
| 8 | 5 ~ 8, 10 |
| 9 | 5 ~ 10 |
| 10 | 5 ~ 7, 10 |
| 11 | 5 ~ 11, 13 |
| 12 | 5 ~ 13 |
| 13 | 5 ~ 10, 13 |
| 14 | 5 ~ 14, 16 |
| 15 | 5 ~ 16 |
| 16 | 5 ~ 13, 16 |
| 17 | 5 ~ 17, 19 |
| 18 | 5 ~ 19 |
| 19 | 5 ~ 16, 19 |
| ⋮ | ⋮ |

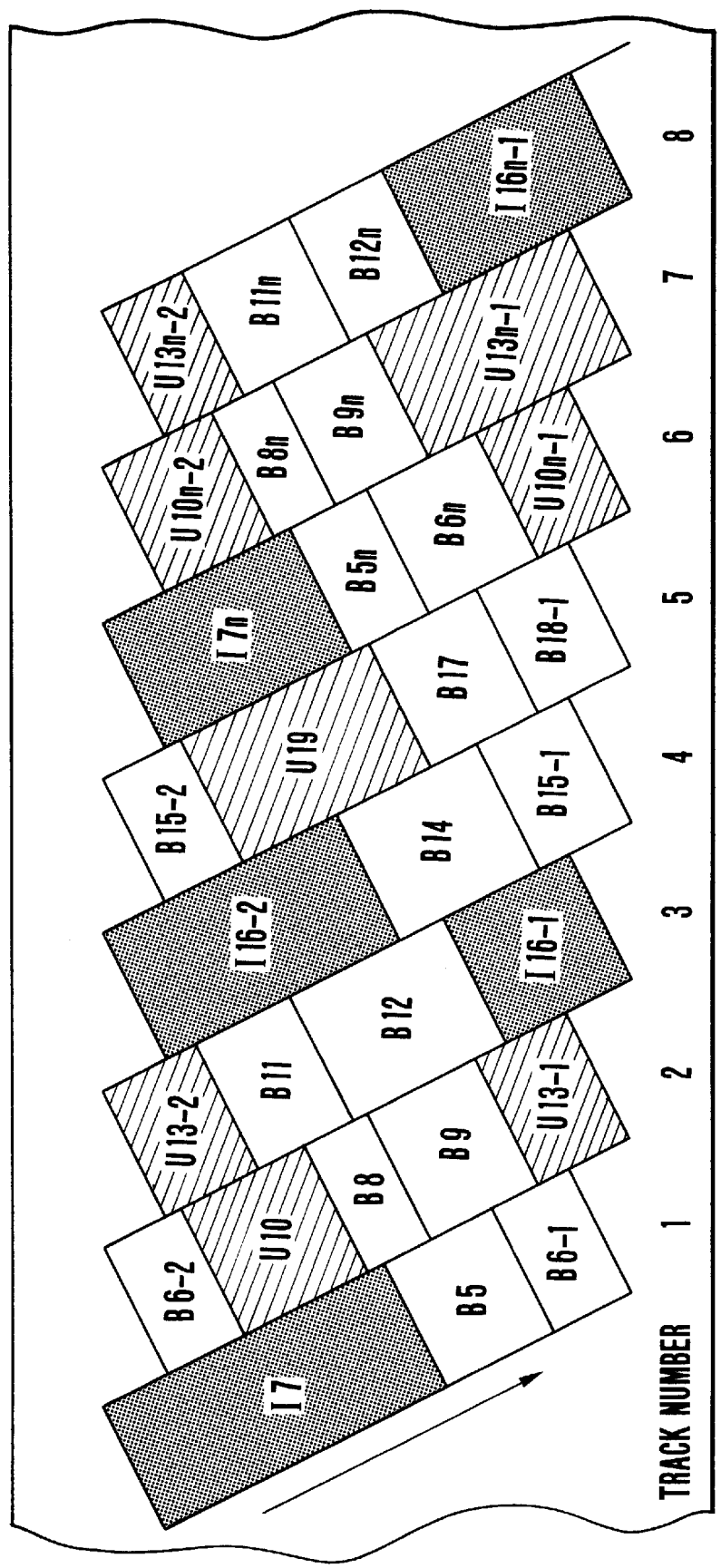

IMAGE SIGNAL RECORDING APPARATUS HAVING INTRAPICTURE AND INTERPICTURE CODING MODES

This is a continuation application under 37 CFR 1.62 of prior application Ser. No. 07/992,851, filed on Dec. 16, 1992 (abandoned).

BACKGROUND OF THE INVENTION

1. Field of the Invention

The present invention relates to an apparatus for recording a moving image and, more particularly, to an apparatus capable of compressing the amount of information by using a correlation between pictures or to an apparatus capable of effecting compression so that each picture has a different amount of information.

2. Description of the Related Art

A digital video tape recorder (VTR) is known as one type of image recording apparatus arranged to digitally compress moving-image information and record the digitally compressed moving-image information on a recording medium such as a magnetic tape. It is also known that there are two types of compression systems: a compression system using a fixed-length coding method; and a compression system using a variable-length coding method.

FIG. 1 is a block diagram schematically showing the arrangement of a conventional example of an image recording and reproducing apparatus using the fixed-length coding method. An analog image signal indicative of a moving image to be recorded is inputted through an input terminal 10. An A/D converter 12 digitizes the analog image signal inputted through the input terminal 10, and a fixed-length coding circuit 14 encodes the output data of the A/D converter 12 by fixed-length coding. A modulating circuit 16 executes suppressed low-frequency modulation of the output of the fixed-length coding circuit 14. The output of the modulating circuit 16 is amplified to a predetermined level by a recording amplifier 18. A switch 20 is arranged to be selectively connected to contacts "a" and "b" during recording and reproduction, respectively. The output of the recording amplifier 18 is applied to a magnetic head 22 through the switch 20, whereby the output is recorded on a magnetic tape 24.

During reproduction, the signal recorded on the magnetic tape 24 is reproduced by the magnetic head 22 and the output of the magnetic head 22 is applied to a demodulating circuit 28 through the switch 20 and a reproducing amplifier 26. A fixed-length decoding circuit 30 is a decoding circuit corresponding to the fixed-length coding circuit 14, and serves to decode the output of the demodulating circuit 28 and output a digital reproduced image signal. The output of the fixed-length decoding circuit 30 is converted into an analog signal by a D/A converter 32, and the analog signal, i.e., an analog reproduced image signal, is outputted for external use through an output terminal 34.

The fixed-length coding circuit 14 normally adopts a coding method in which the amount of data after coding is kept constant for one picture (one field or one frame). The fixed-length coding method includes a pulse-code modulation (PCM) method accompanied by no compression as well as a method accompanied by digital compression, such as a so-called sub-sampling method and a differential coding (DPCM) method. Since the former method does not at all compress image information during processing, no substantial degradation occurs in image quality. However, a huge amount of data must be recorded and the rate of recording must be increased with the result that a large number of disadvantages occur in terms of hardware design and the recording density and time of a recording medium.

If digital compression is executed by using fixed-length coding, a compression ratio of approximately ¼ to ⅙ can be achieved. However, if a high-definition television signal such as an HDTV signal is compressed at such a compression ratio, the amount of information to be recorded will still be excessively large. In addition, a considerable degradation in image quality is visually observed.

In contrast, the variable-length coding method using, for example, a Huffman code or an arithmetic code, can achieve a compression ratio of as high as approximately ¹⁄₁₀ to ¹⁄₂₀ without excessively degrading image quality.

However, the variable-length coding method also has a number of problems. In this coding method, the amount of information recorded per picture is basically inconstant and coding is executed by using a correlation between a plurality of pictures. Therefore, according to the variable-length coding method, it is difficult to realize various reproduction functions such as "edit", "search" and "special reproduction". This problem is particularly outstanding in the field of a digital VTR using as a recording medium a magnetic tape which is a sequential access medium.

SUMMARY OF THE INVENTION

It is, therefore, an object of the present invention to provide a recording apparatus in which it is possible to easily realize various reproduction functions such as "edit", "search" and "special reproduction" and which is capable of effecting recording at a high compression ratio without degrading image quality.

To achieve the above-described object, according to one aspect of the present invention, there is provided a video signal recording apparatus which comprises inputting means for inputting a video signal sequentially containing a plurality of pictures correlated to one another, the video signal having an amount of information, compressing means for compressing the amount of information of the video signal, the compressing means being capable of selectively assuming an intrapicture coding mode for executing compression by using only a correlation within each of pictures of the video signal and an interpicture coding mode for executing compression by using a correlation between a plurality of pictures of the video signal, recording means for recording on a recording medium the video signal the amount of information of which is compressed by the compressing means, operating means for commanding the recording means to start a recording, and controlling means responsive to an operation of the operating means for controlling the compressing means so that a video signal for one picture recorded immediately after the recording means has started the recording becomes a video signal compressed in the intrapicture coding mode.

According to another aspect of the present invention, there is provided a video signal recording apparatus which comprises inputting means for inputting a video signal sequentially containing a plurality of pictures correlated to one another, the video signal having an amount of information, compressing means for compressing the amount of information of the video signal, the compressing means varying an amount by which information is to be outputted for each picture, operating means for commanding a start of recording of the video signal, and recording means for recording the video signal the amount of information of which is compressed by the compressing means, while sequentially forming a multiplicity of tracks on a recording medium, the recording means being responsive to an operation of the operating means to begin recording a video signal for one picture to be recorded immediately after the start of recording, at the forefront of the tracks.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 4 is a table showing the switching sequence of each switch shown in FIG. 3;

FIGS. 5(a) and 5(b) are diagrammatic views aiding in explaining the relations between input images and recorded images in the recording operation of the VTR of FIG. 2;

FIG. 6 is a table showing the relations between final images to be recorded by the VTR of FIG. 2 and actually recorded images;

FIG. 8 is a view showing one example of a track pattern which is formed after tag recording by the VTR of FIG. 2.

DETAILED DESCRIPTION OF THE PREFERRED EMBODIMENTS

Preferred embodiments of the present invention will be described below with reference to the accompanying drawings.

Figure 1:
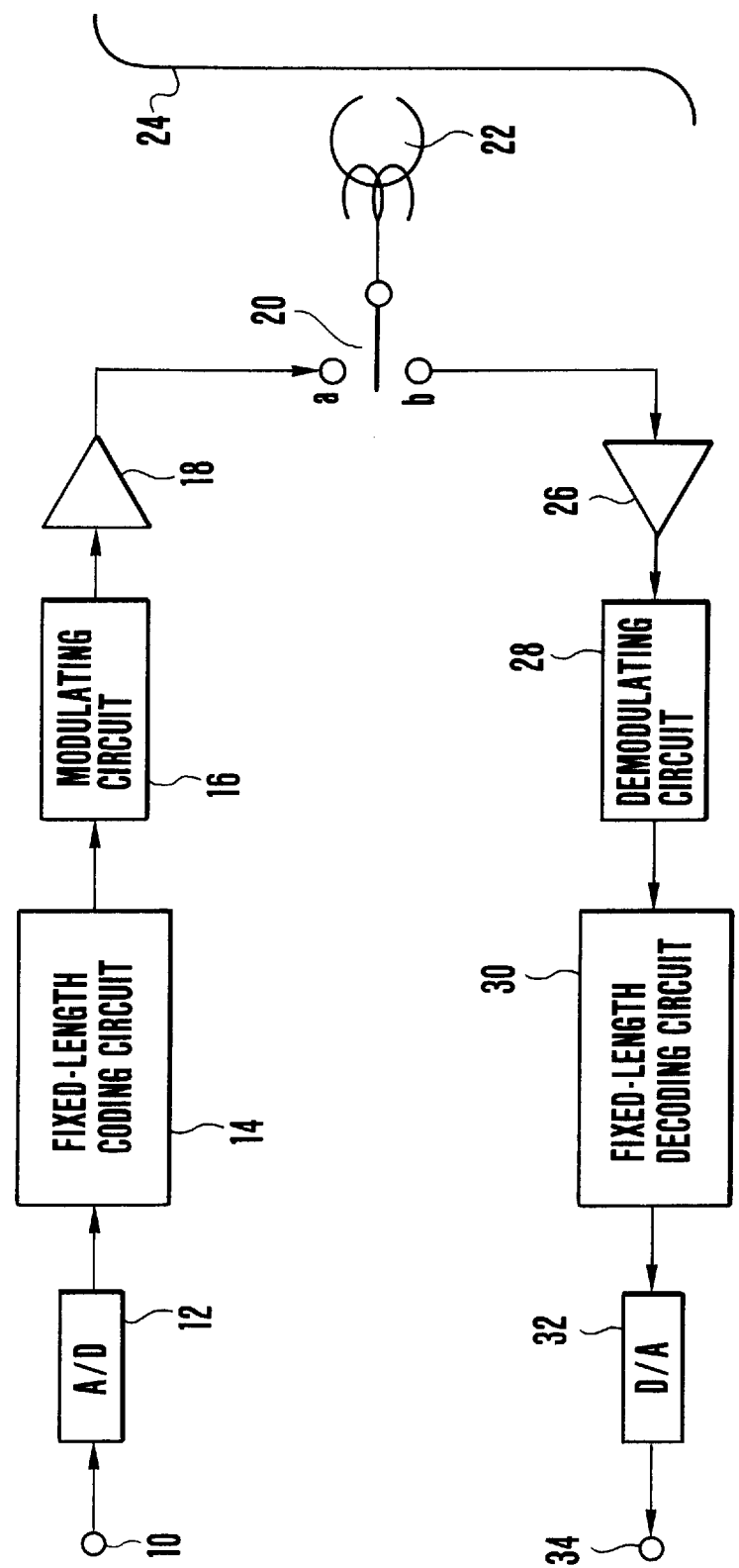
FIG. 1 is a block diagram schematically showing the arrangement of a conventional type of general digital VTR.
Figure 2:
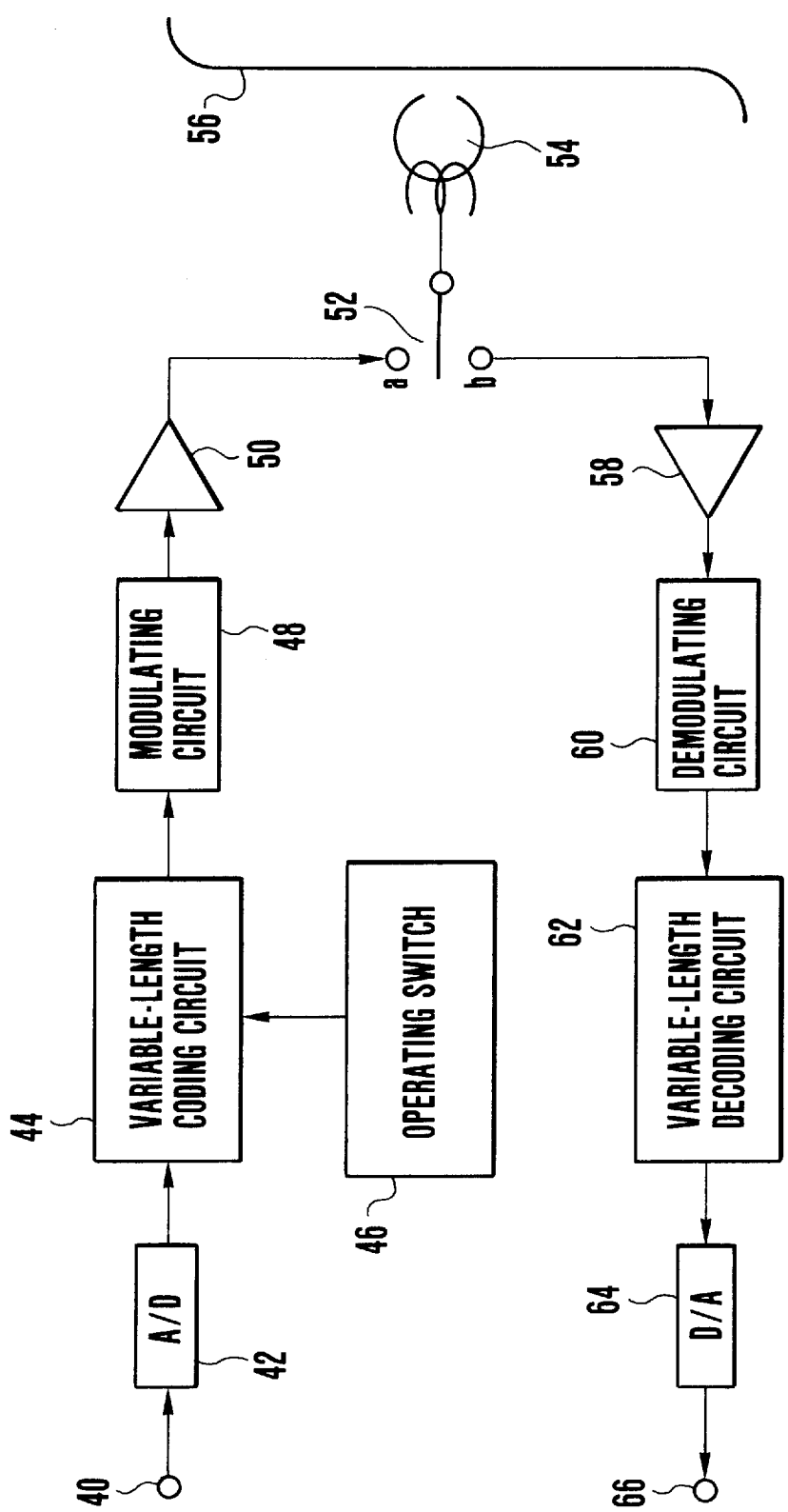
FIG. 2 is a block diagram schematically showing the arrangement of a digital VTR according to one embodiment of the present invention.

FIG. 2 is a block diagram schematically showing the arrangement of a digital VTR according to one embodiment of the present invention.

An analog image signal indicative of a moving image to be recorded is inputted through an input terminal 40. An A/D converter 42 digitizes the analog image signal inputted through the input terminal 40. If recording has not yet been started, a variable-length coding circuit 44 encodes the output data of the A/D converter 42 by intraframe coding. If an instruction to start recording is inputted from an operating switch 46, the variable-length coding circuit 44 starts intraframe and interframe variable-length coding of the output data of the A/D converter 42. If an instruction to stop recording is inputted from the operating switch 46, the variable-length coding circuit 44 stops the intraframe and interframe variable-length coding. The variable-length coding circuit 44 will be described in detail later.

A modulating circuit 48 executes suppressed low-frequency modulation of the output of the variable-length coding circuit 44. The output of the modulating circuit 48 is amplified to a predetermined level by a recording amplifier 50. A switch 52 is arranged to be selectively connected to the contacts "a" and "b" during recording and reproduction, respectively. The output of the recording amplifier 50 is applied to a magnetic head 54 through the switch 52, whereby the output is recorded on a magnetic tape 56.

During reproduction, the signal recorded on the magnetic tape 56 is reproduced by the magnetic head 54 and the output of the magnetic head 54 is applied to a demodulating circuit 60 through the switch 52 and a reproducing amplifier 58. A variable-length decoding circuit 62 is a decoding circuit corresponding to the variable-length coding circuit 44, and serves to decode the output of the demodulating circuit 60 and output a digital reproduced image signal. The output of the variable-length decoding circuit 62 is converted into an analog signal by a D/A converter 64, and the analog signal, i.e., an analog reproduced image signal, is outputted for external use through an output terminal 66.

Figure 3:
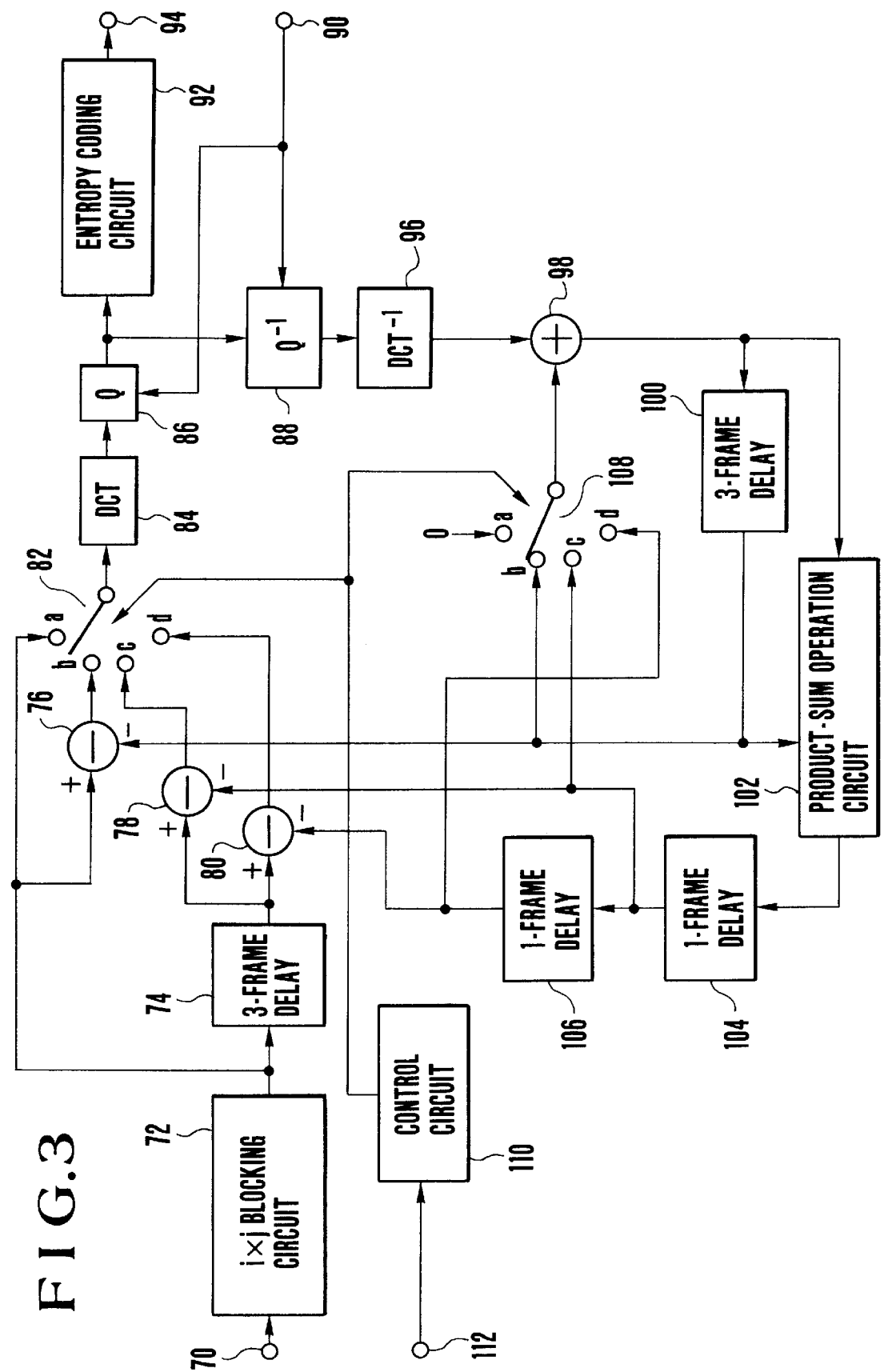
FIG. 3 is a block diagram showing a specific example of the arrangement of the variable-length coding circuit shown in FIG. 2.

FIG. 3 is a block diagram of the arrangement of the variable-length coding circuit 44 which is a feature of the present embodiment, and shows in detail quantizing and predictive coding parts. The shown arrangement includes an input terminal 70 through which the output of the A/D converter 42 is inputted, and a blocking circuit 72 for forming raster-scan image data inputted through the input terminal 70 into blocks each having horizontal i pixels× vertical j pixels. The values of i and j are normally approximately 8 to 16. A delay circuit 74 is provided for delaying the output of the blocking circuit 72 by three frames.

The shown arrangement also includes subtracters 76, 78 and 80 for calculating a prediction error for predictive differential coding. The subtracter 76 subtracts a local decoded value obtained three frames before from the output of the blocking circuit 72. The subtracter 78 subtracts from the output of the three-frame delay circuit 74 image data obtained by interpolating and integrating a local decoded value obtained one frame before and a local decoded value obtained four frames before. The subtracter 80 subtracts from the output of the three-frame delay circuit 74 image data obtained by interpolating and integrating a local decoded value obtained two frames before and a local decoded value obtained five frames before.

The shown arrangement also includes a switch 82 for selecting the output of the blocking circuit 72 (the contact "a"), the output of the subtracter 76 (the contact "b"), the output of the subtracter 78 (the contact "c") or the output of the subtracter 80 (the contact "d").

The shown arrangement also includes a DCT circuit 84 for executing discrete cosine transform of data selected by the switch 82, a quantizing circuit 86 for quantizing the output (frequency coefficient) of the DCT circuit 84 by a different quantum step for each frequency coefficient, and an inverse quantizing circuit 88 for executing inverse quantization of the output of the quantizing circuit 86. The size of the quantum step used in the quantizing circuit 86 greatly influences the compression ratio of information. The respective characteristics of the quantizing circuit 86 and the inverse quantizing circuit 88 can be altered on the basis of a control variable inputted through an input terminal 90. Normally, the control variable is determined according to the occupancy of a data buffer provided at a rear stage, and the respective quantizing characteristics of the quantizing circuit 86 and the inverse quantizing circuit 88 are feedback-controlled.

The shown arrangement also includes an entropy coding circuit 92 for subjecting the output of the quantizing circuit 86 to entropy coding (for example, Huffman coding) utilizing the statistical nature of continuous-zero data, and an output terminal 94 through which the output of the entropy coding circuit 92 is supplied to the modulating circuit 48 of FIG. 2.

The shown arrangement also includes an inverse DCT circuit 96 for executing inverse discrete cosine transform of the output of the inverse quantizing circuit 88, an adder 98 for adding zero or a predetermined predicted value to the output of the inverse DCT circuit 96, a delay circuit 100 for delaying the output of the adder 98 by three frames, a product-sum operation circuit 102 for performing a predetermined weighted product-sum operation on the output of the adder 98 and the output of the three-frame delay circuit 100 and outputting the resultant interpolated and integrated data, a delay circuit 104 for delaying the output of the product-sum operation circuit 102 by one frame, and a delay circuit 106 for delaying the output of the delay circuit 104 by one frame.

The shown arrangement also includes a switch 108 for selecting zero (the contact "a"), the output of the delay circuit 100 (the contact "b"), the output of the delay circuit 104 (the contact "c") or the output of the delay circuit 106 (the contact "d"), and a control circuit 110 for controlling the switches 82 and 108 on the basis of a control signal inputted through an input terminal 112 by the operating switch 46. Each of the switches 82 and 108 is connected to the associated contact "a" irrespective of each frame before a start of recording. If recording is started, each of the switches 82 and 108 is switched every frame in the switching sequence shown in FIG. 4.

As will be described in detail later, if the switches 82 and 108 are connected to the respective contacts "a", intraframe coding is executed. If they are connected to the respective contacts "b", interframe coding of two frames spaced apart by a difference of three frames is executed. If they are connected to the respective contacts "c" or "d", interframe coding (bidirectional coding) based on an interpolated and integrated value of one frame and a subsequent frame spaced apart by two frames is executed.

The operation of the circuit shown in FIG. 3 will be described below with reference to FIGS. 5(a) and 5(b). FIG. 5(a) shows the frame order of image data inputted through the input terminal 70, while FIG. 5(b) shows the frame order of image data recorded on the magnetic tape 56.

Immediately after a recording start switch of the operating switch 46 has been operated, that is, when a frame #7 is inputted, each of the switches 82 and 108 is connected to the associated contact "a" as shown in FIG. 4. The blocking circuit 72 converts raster-scan image data into an array of blocks each consisting of i×j pixels. The output of the blocking circuit 72 is applied to each of the contact "a" of the switch 82, the subtracter 76 and the delay circuit 74. At the instant when the blocking circuit 72 outputs image data relative to the frame #7, the delay circuit 74 outputs image data relative to the frame #4 which was inputted three frames before the frame #7.

The DCT circuit 84 transforms the image data blocked by the blocking circuit 72 into a frequency domain by discrete cosine transform, thereby outputting a conversion coefficient. The quantizing circuit 86 quantizes the output of the DCT circuit 84 by a quantum step having a different size for each conversion coefficient. The size of the quantum step used in the quantizing circuit 86 is controlled by a control coefficient inputted through the input terminal 90.

The entropy coding circuit 92 executes entropy coding of the output of the quantizing circuit 86, and the output of the entropy coding circuit 92 is supplied to the modulating circuit 48 of FIG. 2 through the output terminal 94. The image obtained at this time is an intraframe-coded frame (hereinafter referred to as the "I frame") which is compressed and coded within one frame.

The inverse quantizing circuit 88 executes inverse quantization of the output of the quantizing circuit 86, and the inverse DCT circuit 96 executes inverse quantization of the output of the inverse quantizing circuit 88. Since the switch 108 is connected to the contact "a", the adder 98 outputs the output of the inverse DCT circuit 96 as it is inputted. The output of the adder 98 is applied to each of the three-frame delay circuit 100 and the product-sum operation circuit 102.

At this time, the output of the delay circuit 100 is local decoded image data relative to the frame #4 and the product-sum operation circuit 102 outputs interpolated and integrated image data obtained by performing a weighted product-sum operation on the frames #7 and #4.

At the instant when a frame #8 which is the second frame is inputted, the switches 82 and 108 are connected to the respective contacts "c" as shown in FIG. 4, that is, the switch 82 selects the output of the subtracter 78. At this time, the delay circuit 74 outputs image data relative to a frame #5, the delay circuit 100 outputs local decoded data obtained from intraframe-coded data relative to the frame #5, and the delay circuit 104 outputs interpolated and integrated data obtained from the frames #7 and #4. The subtracter 78 subtracts the interpolated and integrated data (bidirectional-predicted image data) obtained from the frames #7 and #4, from the image data relative to the frame #5. The output of the subtracter 78 is applied to the DCT circuit 84 through the switch 82.

The output of the subtracter 78 is subjected to discrete cosine transform by the DCT circuit 84, and the output of the DCT circuit 84 is quantized by the quantizing circuit 86. The entropy coding circuit 92 executes entropy coding of the output of the quantizing circuit 86, and the output of the quantizing circuit 86 is supplied to the modulation circuit 48 of FIG. 2 through the output terminal 94. The image obtained at this time is an image which has been subjected to differential coding based on a predicted value which is an integrated value of the frames #4 and #7 which are inputted before and after the frame #5 of interest. Such an image is hereinafter referred to as the "bidirectional-prediction-interpolation frame" (called "B frame").

Bidirectional-predictive-coded data relative to the frame #5 is inversely transformed through the inverse quantizing circuit 88 and the inverse DCT circuit 96, and interpolated and integrated data (bidirectional-predicted image data) obtained from the frames #7 and #4 is added to the output of the inverse DCT circuit 96 in the adder 98, whereby the image data indicative of the frame #5 is decoded. The decoded image data is applied to each of the delay circuit 100 and the product-sum operation circuit 102.

At the instant when a frame #9 which is the third frame is inputted, the switches 82 and 108 are connected to the respective contacts "d" as shown in FIG. 4, that is, the switch 82 selects the output of the subtracter 80. At this time, the delay circuit 74 outputs image data relative to a frame #6, the delay circuit 100 outputs local decoded data obtained from intraframe-coded data relative to the frame #6, and the delay circuit 106 outputs interpolated and integrated data obtained from the frames #7 and #4. The subtracter 80 subtracts the interpolated and integrated data (bidirectional-predicted image data) obtained from the frames #7 and #4, from the image data relative to the frame #6. The output of the subtracter 80 is applied to the DCT circuit 84 through the switch 82.

The output of the subtracter 80 is processed similarly to the preceding frame through the DCT circuit 84, the quantizing circuit 86 and the entropy coding circuit 92, and the output of the entropy coding circuit 92 is supplied to the modulating circuit 48 of FIG. 2 through the output terminal 94. The image obtained at this time is an image which has been subjected to differential coding based on a predicted value which is an integrated value of the frames #4 and #7 which are inputted before and after the frame #6 of interest. Accordingly, the image constitutes the bidirectional-prediction·interpolation frame (B frame).

Bidirectional-predictive-coded data relative to the frame #6 is decoded through the inverse quantizing circuit 88, the inverse DCT circuit 96 and the adder 98. The decoded image data relative to the frame #6 is applied to each of the delay circuit 100 and the product-sum operation circuit 102.

At the instant when a frame #10 which is the fourth frame is inputted, the switches 82 and 108 are connected to the respective contacts "b" as shown in FIG. 4, that is, the switch 82 selects the output of the subtracter 76. At this time, the delay circuit 100 outputs local decoded data obtained from intraframe-coded data relative to the frame #7. The subtracter 76 subtracts the local decoded value (interframe-predicted image data) obtained from the frame #7, from image data relative to the frame #10. The output of the subtracter 76 is applied to the DCT circuit 84 through the switch 82.

The output of the subtracter 76 is compressed and coded through the DCT circuit 84, the quantizing circuit 86 and the entropy coding circuit 92, and the output of the entropy coding circuit 92 is supplied to the modulating circuit 48 of FIG. 2 through the output terminal 94. The image obtained at this time is an image which has been subjected to differential coding based on a predicted value which is a decoded value of the frame #7 which is inputted three frames before the frame #10 of interest. Such an image is hereinafter referred to as the interframe-coded frame (called "U frame").

The interframe-coded data relative to the frame #10 is decoded through the inverse quantizing circuit 88, the inverse DCT circuit 96 and the adder 98. The decoded image data relative to the frame #10 is applied to each of the delay circuit 100 and the product-sum operation circuit 102.

Subsequently, two B frames, one U frame and two B frames are formed in that order, and then one I frame is formed. Subsequently, formation of I, U and B frames is repeated in a similar manner.

The operation of stopping recording will be described below. In the present embodiment, it may be necessary to record frames inputted after an instruction to stop recording has been inputted, because of the presence of a bidirectional-prediction·interpolation frame. For example, as shown in FIG. 5(a), it is assumed that an instruction to stop recording is inputted from the operating switch 46 between frames #15 and #16. In this case, since the frame #15 is a bidirectional-prediction·interpolation frame, data relative to the frame #16 is needed to decode the frame #15. For this reason, the frames #14, #15 and #16 are recorded in the order of #16, #14 and #15. FIG. 6 shows the relations of correspondence which are established between frames inputted at the time of stop of recording and recorded frames if recording is started with the frame #7.

Figure 7:
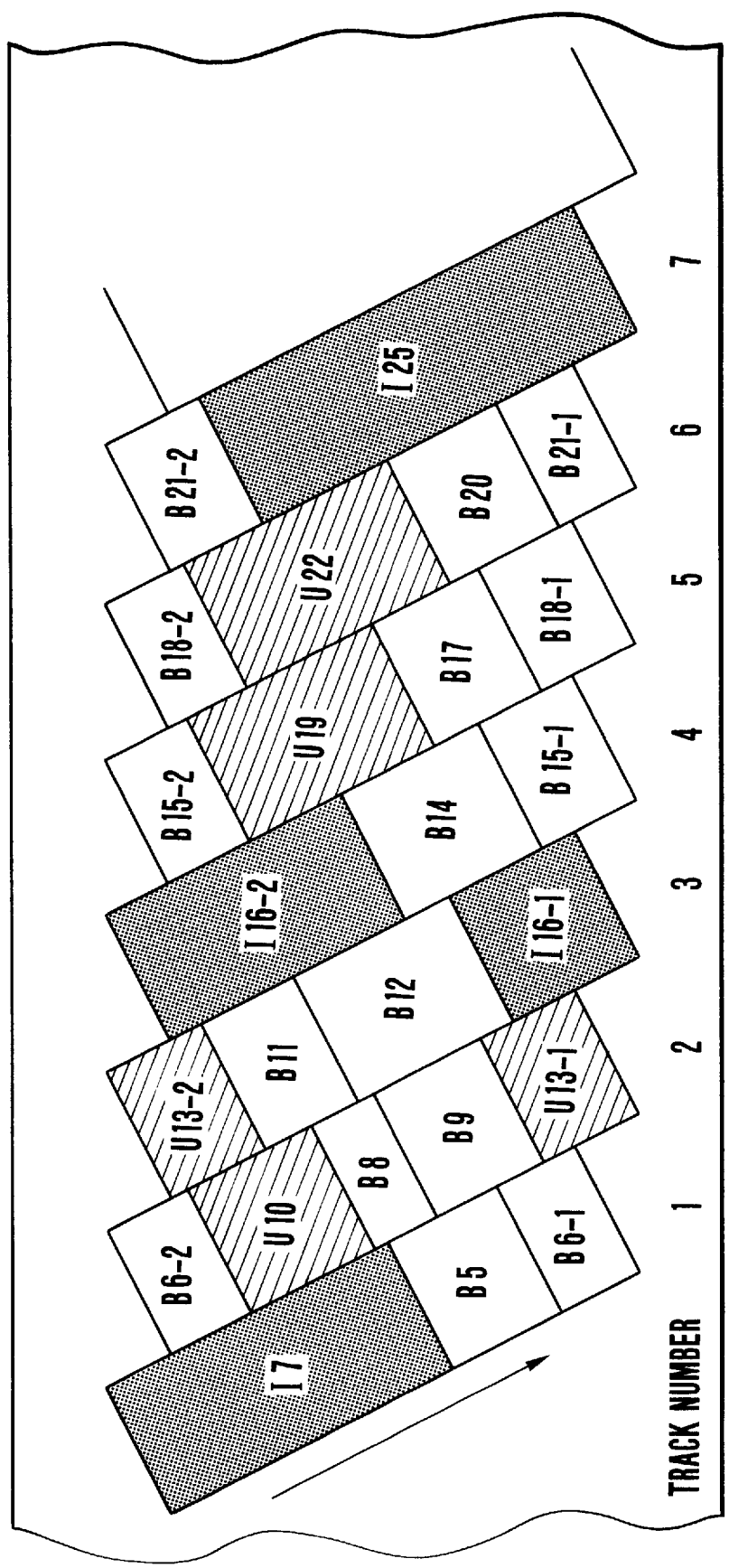
FIG. 7 is a view showing one example of a recording track pattern formed by the VTR of FIG. 2.

FIG. 7 shows one example of a track pattern formed on the magnetic tape 56 by variable-length coded image data relative to each frame. Since each frame is variable-length coded, each frame has a different amount of recorded data, and data relative to one frame is often recorded over a plurality of tracks. In FIG. 7, frame numbers are added after the respective characters "B", "U" and "I" indicative of the B, U and I frames, and if one frame is recorded over a plurality of tracks, subnumbers are added after the associated frame numbers.

It is assumed that a user desires to record an image after the frame #15 by tag recording in the pattern shown in FIG. 7. In this case, in the present embodiment, the operator performs the operation of returning the magnetic head 54 to the first recording track, i.e., a track #1, reproducing the frames #8, #9 and #10 from the frame #7 and outputting the reproduced image data, and operating the recording start switch of the operating switch 46 at the time when an image indicative of the frame #15 is reproduced and outputted. According to this operation, variable-length coded data relative to images to be tag-recorded begin to be sequentially recorded at the forefront of a track next to the track on which the image indicative of the frame #15 is recorded.

FIG. 8 shows a recording track pattern formed by the tag recording. In FIG. 8, for ease of understanding, recording of the images to be tag-recorded is assumed to be started with the frame #7, and "n" is added to each of the associated frame numbers. For example, "I7n" indicates that the frame #7 which is recorded as one of the tag-recorded images constitutes the I frame.

A mark or a signal indicating that the image (the frame #7) is tag-recorded after the frame #15 which is a previously recorded image is recorded in a predetermined location on the magnetic tape 56, for example, in a control track extending along the length of the magnetic tape 56.

During reproduction, immediately after an image indicative of the frame #15 has been reproduced and outputted, an image indicative of the frame #7n can be continuously reproduced and outputted on the basis of the mark or signal indicative of the tag recording.

Although the above description refers to coding executed on a frame-by-frame basis, coding executed on a field-by-field basis may be adopted. The location and number of intraframe-coded frames, those of interframe-coded frames and those of bidirectional-prediction·interpolation frames are not limited to the above-described example. Of course, the variable-length coding method used in the above-described embodiment is not to be construed as a limiting example.

Although the above description refers to the example in which interframe coding, intraframe coding and bidirectional predictive coding are used in combination, the present invention is, of course, applicable to a case where one or two of the three codings is used.

Although the above description refers to the example in which the magnetic tape is used as a recording medium, a magnetic disk, an optical disk, an opto-magnetic disk or other recording media may be used without departing from the scope of the present invention.

As will be readily understood from the foregoing description, in the VTR according to the aforesaid embodiment, recording of an image is started at a predetermined location of a track (normally, the forefront thereof). Accordingly, even if a tag-recorded image is included in recorded images, it is possible to easily control a reproduction operation so that a reproduced image is not disturbed, whereby a continuous reproduced image can be obtained.

Further, since an initial picture recorded after a start of recording is a picture which is coded by using only a correlation within the picture, "edit", "search" and other similar functions can be easily performed. Further, since pictures each of which is coded by using only a correlation within the picture are present at intervals of predetermined number of pictures, "edit", "search", "special reproduction" and other similar functions can be comparatively easily achieved. Further, since an image which is highly compressed by using interpicture coding is located at an adequate position, a comparatively high compression ratio can be achieved as a whole.

What is claimed is:

1. An image signal recording apparatus comprising:
   (a) inputting means for inputting an image signal sequentially containing a plurality of picture signals indicative of pictures correlated to one another, each picture signal having an amount of information;
   (b) compressing means for compressing the amount of information of each picture signal and outputting compressed picture signals, said compressing means being capable of selectively assuming an intrapicture coding mode for executing compression by using only a correlation within individual pictures of the image signal and an interpicture coding mode for executing compression by using a correlation between a plurality of pictures of the image signal;
   (c) recording means for recording the compressed picture signals output by said compressing means in a multiplicity of discontinuous tracks on a tape-shaped recording medium, the compressed picture signals being recorded such that boundaries of the plurality of picture signals are located at variable positions of the tracks;
   (d) operating means operable for commanding said recording means to start recording; and
   (e) controlling means responsive to an operation of said operating means for controlling said compressing means so that a compressed picture signal for one picture first recorded on the recording medium is a picture signal compressed in the intrapicture coding mode and is recorded from one of predetermined positions of the respective discontinuous tracks but picture signals compressed in the intrapicture coding mode and continuously recorded are recorded from variable positions of the track, the predetermined positions being aligned in a longitudinal direction of the recording medium irrespective of the previous recording so that the facilitation of editing with respect to recording units is made up of plural sequential pictures without substantially lowering the efficiency with respect to compression.

2. An apparatus according to claim 1, wherein compressed picture signals have varying amounts of information.

3. An apparatus according to claim 2, wherein said compressing means includes an orthogonal transform circuit for executing orthogonal transform of the picture signals and a coding circuit for executing variable-length coding of signals output from the orthogonal transform circuit.

4. An apparatus according to claim 1, wherein said controlling means controls said compressing means so that said compressing means compresses the amount of information of the picture signals mutually spaced in the sequence in the intrapicture coding mode and compresses the amount of information of the other picture signals in the sequence in the interpicture coding mode.

5. An apparatus according to claim 4, wherein the interpicture coding mode of said compressing means has a first mode for executing compression by using a correlation between a picture signal to be coded and only one other picture signal and a second mode for executing compression by using a correlation between a picture signal to be coded and a plurality of other signals.

6. An apparatus according to claim 5, wherein said controlling means controls said compressing means so that, while the amount of information of picture signals is continually compressed in the interpicture coding mode by said compressing means, said compressing means compresses the amount of information of picture signals mutually spaced in the sequence in the first mode and compresses the amount of information of the other picture signals in the sequence in the second mode.

7. An apparatus according to claim 1, wherein said compressing means rearranges an order in which a plurality of picture signals are inputted from said inputting means and outputs the plurality of picture signals in the rearranged order.

8. An apparatus according to claim 7, wherein said compressing means outputs a picture signal compressed in the intrapicture coding mode and indicative of a predetermined picture, prior to a picture signal compressed in the interpicture coding mode and indicative of a picture prior in said sequence to the predetermined picture.

9. An image signal recording apparatus, comprising:
   (a) recording means for recording a signal while sequentially forming a multiplicity of discontinuous tracks on a tape-shaped recording medium, the tracks having a common length in the longitudinal direction thereof and being parallel with each other;
   (b) supply means for supplying a compressed image signal to said recording means, said compressed image signal sequentially containing a plurality of picture signals and being compressed in an amount of information thereof, said plurality of picture signals including a first compressed picture signal for one picture compressed by using only a correlation within individual pictures of the image signal and a second compressed picture signal for one picture compressed by using a correlation between a plurality of pictures of the image signal, the compressed image signal being recorded by said recording means such that boundaries of the plurality of picture signals are located at variable positions of the tracks;
   (c) operating means operable for generating a starting command to command said recording means to start recording; and
   (d) controlling means responsive to the starting command for controlling the apparatus so that a compressed picture signal for one picture first recorded on the recording medium is the first compressed picture signal and is recorded from one of predetermined positions of the respective discontinuous tracks but the first picture signal continuously recorded are recorded from variable positions of the track, the predetermined position being aligned in a longitudinal direction of the recording medium irrespective of the previous recording so that the facilitation of editing with respect to recording units is made up of plural sequential pictures without substantially lowering the efficiency with respect to compression.

10. An apparatus according to claim 9, wherein said predetermined position is the forefront of the tracks.

11. An apparatus according to claim 9, wherein said supply means comprises an input circuit for inputting an image signal, and a compression circuit for compressing an amount of information of the image signal input by said input circuit to supply the compressed image signal, and said control means controls an operation of the compression circuit.

12. An apparatus according to claim 9, wherein said recording medium is a magnetic tape and the tracks are obliquely formed on the magnetic tape.

13. An apparatus according to claim 9, wherein the first and second compressed picture signals have varying amounts of information and include codes which are formed by orthogonal transforming image information.

14. An apparatus according to claim 13, wherein the first compressed picture signals are periodically supplied in the compressed image signal by said supply means.

15. An apparatus according to claim 14, wherein the second compressed picture signals include a picture signal for one picture which is compressed by using only a correlation between a subject picture and a preceding picture and a picture signal for one picture which is compressed by using both of correlations between the subject picture and preceding and following pictures.

16. An apparatus according to claim 9, wherein said operating means is able to generate a stopping command to command said recording means to stop recording and said control means controls the apparatus in response to the stopping command so that said recording means stops recording after all of compressed picture signals corresponding to a plurality of pictures of the image signal which are necessary to replace the compressed picture signal currently recorded are recorded.

17. An image signal recording apparatus, comprising:
 (a) a recording circuit which includes a magnetic head for recording a signal while sequentially forming ;a multiplicity of discontinuous oblique tracks on a magnetic tape, the tracks having a common length in the longitudinal direction thereof and being parallel with each other;
 (b) a supply circuit for supplying a compressed image signal to said magnetic head, said compressed image signal sequentially containing a plurality of picture signals and being compressed in an amount of information thereof, said plurality of picture signals including a first compressed picture signal for one picture compressed by using only a correlation within individual pictures of the image signal and a second compressed picture signal for one picture compressed by using a correlation between a plurality of pictures of the image signal, the first and second compressed picture signals having varying amounts of information and including codes which are formed by orthogonal transforming image information, the compressed image signal being recorded by said recording circuit such that boundaries of the plurality of picture signals are located at variable positions of the tracks;
 (c) a manually operable member for generating a starting command to command said recording circuit to start recording; and
 (d) a control circuit responsive to the starting command for controlling the apparatus so that a compressed picture signal for one picture first recorded on the magnetic tape is the first compressed picture signal and is recorded from one of the predetermined positions of the respective discontinuous tracks but the first picture signal continuously recorded are recorded from variable positions of the track, the predetermined positions being aligned in a longitudinal direction of the magnetic tape irrespective of the previous recording so that the facilitation of editing with respect to recording units is made up of plural sequential pictures without substantially lowering the efficiency with respect to compression.

18. An apparatus according to claim 17, wherein said predetermined position is the forefront of the tracks.

19. An apparatus according to claim 17, wherein said manually operable member is able to generate a stopping command to command said recording circuit to stop recording and said control circuit controls the apparatus in response to the stopping command so that said recording circuit stops recording after all of compressed picture signals corresponding to a plurality of pictures of the image signal which are necessary to replace the compressed picture signal currently recorded are recorded.

* * * * *

UNITED STATES PATENT AND TRADEMARK OFFICE
CERTIFICATE OF CORRECTION

PATENT NO. : 5,774,624
DATED : June 30, 1998
INVENTOR(S) : Masahiko Enari

It is certified that error appears in the above-identified patent and that said Letters Patent is hereby corrected as shown below:

Col. 11, line 24, delete ";".

Signed and Sealed this

Fifteenth Day of December, 1998

Attest:

BRUCE LEHMAN

Attesting Officer

Commissioner of Patents and Trademarks